United States Patent Office 3,118,878
Patented Jan. 21, 1964

3,118,878
SUBSTITUTED PHOSPHORAMIDOPENICILLANIC ACIDS
John Herbert Charles Nayler, Dorking, and Edward Raymond Stove, Redhill, England, assignors to Beecham Research Laboratories Limited, Brentford, England, a British company
No Drawing. Filed June 1, 1960, Ser. No. 33,111
Claims priority, application Great Britain June 9, 1959
5 Claims. (Cl. 260—239.1)

This invention relates to substances having antibiotic activity which are of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to a class of derivatives of 6-aminopenicillanic acid, which we term substituted phosphoramidopenicillanic acids.

Antibacterial agents such as benzylpenicillin have proved highly effective in the past in the therapy of infections due to Gram-positive bacteria but such agents suffer from the serious drawbacks of being unstable in aqueous acids, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their antibacterial activity, exhibit resistance to destruction by acid or by penicillinase or are effective against benzylpenicillin-resistant strains of bacteria or inhibit benzylpenicillinase and thus potentiate the action of benzyl penicillin when admixed therewith.

There is provided, according to the present invention, a member selected from the group consisting of an acid having the formula:

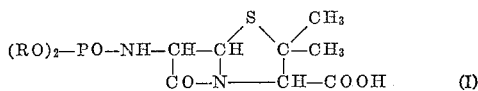
(I)

wherein R is an alkyl, aralykyl or aryl group, and their nontoxic salts.

Thus R may be an alkyl group having 1 to 20 carbon atoms inclusive. The term "alkyl" as used herein refers to straight and branched chain saturated aliphatic hydrocarbon groups having from 1 to 20 carbon atoms inclusive, e.g., methyl, ethyl, propyl, butyl, isobutyl, amyl, hexyl, lauryl, tetradecyl, hexadecyl, octadecyl, etc. The "(lower)alkyl" groups, i.e., those having from 1 to 6 carbon atoms, inclusive, are preferred. R may also be an alicyclic group such as cyclopentyl, cyclohexyl or cycloheptyl. Where R is aryl it may be phenyl or the radical

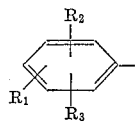

wherein $R_1$, $R_2$ and $R_3$ are each members selected from the group consisting of hydrogen, nitro, amino, (lower)alkylamino, di(lower)alkylamino, acylamino (where the acylating agent is an aliphatic carboxylic acid containing from one to ten carbon atoms inclusive and the substituent may thus also be named (lower)alkanoylamino), (lower)alkyl, fluoro, chloro, bromo, iodo, (lower)alkoxy, hydroxy, (lower)alkylthio, (lower)alkylsulfonyl, sulfamyl, benzyl, cyclohexy, cyclopentyl and trifluoromethyl. Where R is aralkyl it is perferably benzyl but may also be

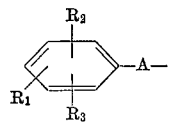

wherein $R_1$, $R_2$ and $R_3$ have the meaning set forth above and A represents a bivalent saturated alkylene chain which may be a straight or a branched chain and which contains from one to ten carbon atoms inclusive. Suitable salts include nontoxic metalilc salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkyl-piperidines, especially N-ethyl-piperidine, and other amines which have been used to form salts with benzylpenicillin. Also included within the scope of the present invention are easily hydrolysed esters which are converted to the free acid form by chemical or enzymatic hydrolysis.

The present invention also includes a process for the preparation of compounds of the general Formula I wherein 6-aminopenicillanic acid, or liquor containing 6-aminopenicillanic acid, is reacted with a chlorophosphate of the general formula:

$$(RO)_2-PO-Cl \qquad (II)$$

where R is as defined above.

Examples of suitable chlorophosphate reagents include dibenzyl chlorophosphate (II; R=Ph.CH$_2$), dibutyl chlorophosphate (II; R=C$_4$H$_9$.n) and diphenyl chlorophosphate (II; R=Ph).

One method of preparing compounds of the present invention comprises adding a solution of the chlorophosphate in a solvent to a suspension of 6-aminopenicillanic acid in a solvent, e.g., chloroform, containing a tertiary hydrocarbonyl amine, e.g., triethylamine. The tertiary base takes up hydrogen chloride eliminated from the reaction. The reaction mixture is stirred for a period of about one hour, made acid by the addition of dilute mineral acid, and the chloroform layer extracted. The chloroform layer may then be neutralized by the addition of aqueous sodium bicarbonate and the mixture evaporated at a low temperature and pressure to obtain the sodium salt of the phosphoramino penicillanic acid.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the proces at a pH of from 6 to 9, and this can conveniently be achieved by using a buffer, for example a solution of sodium bicarbonate, or a sodium phosphate buffer.

At the conclusion of the reaction, the products are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt or an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. One method of isolating the product as a crystalline potassium salt comprises extracting the product from an acidic, aqueous solution (e.g., pH 2) into diethyl ether, drying the ether and adding at least one equivalent of a concentrated solution of potassium 2-ethylhexanoate in dry n-butanol. The potassium salt forms, precipitates, usually in crystalline form, and is collected by filtration or decantation.

6-aminopenicillanic acid is prepared according to Batchelor et al. (Nature 183, 257–258, January 24, 1959) or Belgian Patent 569,728.

The following examples illustrate the invention:

*Example 1.—Preparation of 6-(Dibenzylphosphoramido)-Penicillanic Acid*

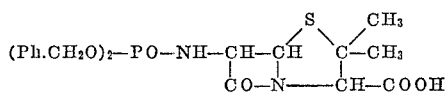

A solution of dibenzyl chlorophosphate (830 mg.) in dry chloroform (8 ml.) was slowly added to a stirred suspension of 6-aminopenicillanic acid (500 mg., approx. 75% pure) in dry chloroform (12 ml.) containing triethylamine (1 ml.). After 15 minutes stirring at room temperature a homogeneous solution resulted, but stirring was continued for a further 30 minutes the mixture was shaken with 0.2 N hydrochloric acid (22 ml.) and, after discarding the aqueous layer, the chloroform layer was washed with water (20 ml.). The chloroform solution was then neutralized by adding 3% aqueous sodium bicarbonate solution (6.4 ml.), but the layers could not be separated owing to the formation of an emulsion. The whole mixture was therefore evaporated at low temperature and pressure, and the residual sticky solid was washed twice with carbon tetrachloride and then dried in vacuo to leave the crude sodium salt of 6-(dibenzylphosphoramido)penicillanic acid as a brown solid (626 mg.). The product is found to contain the β-lactam structure by infrared analysis and to inhibit *Staph. aureus* Smith at a concentration of less than 0.001 percent by weight.

*Example 2.—Preparation of 6-(Diphenylphosphoramido)-Penicillanic Acid*

Pure 6-aminopenicillanic acid (1.73 g.) was allowed to react with diphenyl chlorophosphate (2.4 g.) in dry chloroform containing triethylamine (3.4 ml.) as described in Example 1, except that the mixture was stirred for 90 minutes. The mixture was worked up as described in Example 1 to yield the crude sodium salt of 6-(diphenylphosphoramido)penicillanic acid which, after being washed with ether, was obtained as a light brown powder (1.77 g.). The product is found to contain the β-lactam structure by infrared analysis and to inhibit *Staph. aureus* Smith at a concentration of less than 0.001 percent by weight.

*Example 3.—Preparation of 6-(Di-n-butylphosphoramido)Penicillanic Acid*

A solution of di-n-butylphosphoryl chloride (6.5 g.) in dry acetone (40 ml.) was added dropwise to a stirred solution of 6-aminopenicillanic acid (5.63 g.) and sodium bicarbonate (6.55 g.) in water (100 ml.) and acetone (60 ml.). When addition was complete the mixture was stirred at room temperature for 2½ hours and then extracted with ether (2×100 ml.) only the aqueous phase being retained. This aqueous solution was covered with ether (50 ml.) and adjusted to pH 2 by the addition of N hydrochloric acid (45 ml.). The mixture was well shaken, the layers separated, and the aqueous phase extracted with two further 25 ml. portions of ether. The combined ether solution (which at this stage contained the product as the free acid) were washed with water (50 ml.) and then shaken with sufficient N sodium bicarbonate solution to give a neutral aqueous phase (pH 7). The layers were separated and the ether pahse was extracted with two 5 ml. portions of water to each of which was added sufficient sodium bicarbonate solution to produce an aqueous phase of pH 7. The aqeuous extracts were combined, washed with ether (20 ml.), and then evaporated at low temperature and pressure to leave the crude sodium salt of 6-(di-n-butylphosphoramido)penicillanic acid as a white powder (4.6 g.). The product is found to contain the β-lactam structure by infrared analysis and to inhibit *Staph. aureus* Smith at a concentration of less than 0.001 percent by weight.

We claim:
1. A member selected from the group consisting of the acids having the formula:

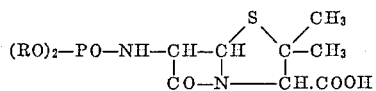

wherein R is a member selected from the group consisting of alkyl wherein said alkyl is a member selected from the group consisting of straight and branched chain saturated aliphatic hydrocarbon groups containing from one to twenty carbon atoms, aryl wherein said aryl is the radical having the formula

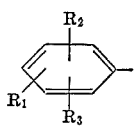

wherein $R_1$, $R_2$ and $R_3$ are each members selected from the group consisting of hydrogen, nitro, amino, (lower)alkylamino, di(lower)alkylamino, (lower)alkanoylamino, (lower)alkyl, fluoro, bromo, chloro, iodo, (lower)alkoxy, hydroxy, (lower)alkylthio, (lower)alkylsulfonyl, sufamyl, benzyl, cyclohexyl, cyclopentyl and trifluoromethyl and aralkyl wherein said aralkyl is the radical having the formula

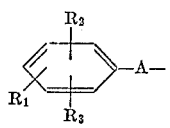

wherein $R_1$, $R_2$ and $R_3$ have the meaning set forth above and A represents a bivalent saturated alkylene chain containing from one to ten carbon atoms, and their sodium, potassium, calcium, aluminum and ammonium salts and their nontoxic substituted ammonium salts with an amine selected from the group consisting of tri(lower)alkylamines, procaine, dibenzylamine, N-benzyl-beta-phenethylamine, 1-ephenamine, N,N'-dibenzylethylenediamine, dehydroabietylamine, N-(lower)alkylpiperidines and N,N'-bis-dehydroabietylethylenediamine.

2. An acid having the formula:

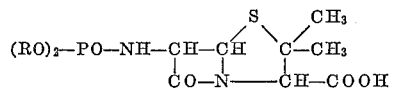

wherein R represents (lower)alkyl.

3. 6-(di-n-butylphosphoramido)penicillanic acid.
4. 6-(dibenzylphosphoramido)penicillanic acid.
5. 6-(diphenylphosphoramido)penicillanic acid.

References Cited in the file of this patent

UNITED STATES PATENTS 2,941,995  Doyle et al. _____ June 21, 1960

FOREIGN PATENTS 569,728  Belgium _____ Nov. 15, 1958